US012200564B2

(12) United States Patent
Zucker

(10) Patent No.: US 12,200,564 B2
(45) Date of Patent: Jan. 14, 2025

(54) SYSTEM AND METHOD TO REGISTER IMPROVED ACCURACY GEOFENCES

(71) Applicant: TG-17, Inc., Boston, MA (US)

(72) Inventor: Ofir Zucker, Tel Aviv (IL)

(73) Assignee: TG-17, Inc., Boston, MA (US)

( * ) Notice: Subject to any disclaimer, the term of this patent is extended or adjusted under 35 U.S.C. 154(b) by 383 days.

(21) Appl. No.: 17/704,489

(22) Filed: Mar. 25, 2022

(65) Prior Publication Data

US 2022/0312148 A1 Sep. 29, 2022

Related U.S. Application Data

(60) Provisional application No. 63/166,057, filed on Mar. 25, 2021.

(51) Int. Cl.
*H04W 4/021* (2018.01)
*H04W 4/029* (2018.01)
*H04W 60/04* (2009.01)

(52) U.S. Cl.
CPC .......... *H04W 4/021* (2013.01); *H04W 4/029* (2018.02); *H04W 60/04* (2013.01)

(58) Field of Classification Search
None
See application file for complete search history.

(56) References Cited

U.S. PATENT DOCUMENTS

2015/0148060 A1 5/2015 Parab et al.
2015/0281889 A1 10/2015 Menendez
2019/0037343 A1* 1/2019 Parab .................... H04W 4/021
2020/0314587 A1* 10/2020 Gurin .................... H04W 4/029

OTHER PUBLICATIONS

International Search Report and Written Opinion in related international application No. PCT/US2022/021904 on Jul. 4, 2022.

* cited by examiner

*Primary Examiner* — Frantz Bataille
(74) *Attorney, Agent, or Firm* — Polsinelli, P.C.

(57) ABSTRACT

The present disclosure is directed to systems and techniques for improved geofence registration for automatic detection of geographic region crossings. In one example, the systems and techniques can register a first geofence encompassing a first area, wherein the first area is associated with a first location coordinate. A composite geofence can be generated encompassing a refined geofence area that is a subset of the first area, wherein the composite geofence includes the first geofence and one or more additional geofences. Each of the one or more additional geofences can be registered using an offset relative to the first location coordinate. An occurrence of a geofence event can be determined for at least one of the additional geofences. Based on the occurrence of the geofence event for at least one of the additional geofences, an exit notification can be generated for the refined geofence area of the composite geofence.

20 Claims, 4 Drawing Sheets

SYSTEM AND METHOD TO REGISTER IMPROVED ACCURACY GEOFENCES

CROSS-REFERENCE TO RELATED APPLICATIONS

This application claims the benefit of priority to U.S. Provisional Application No. 63/166,057, filed Mar. 25, 2021 and entitled "SYSTEM AND METHOD TO REGISTER IMPROVED ACCURACY GEOFENCES," the disclosure of which is herein incorporated by reference in its entirety.

TECHNICAL FIELD

The present disclosure pertains to location determination, and more specifically pertains to systems and techniques for improved geofence registration for automatic detection of geographic region crossings.

BACKGROUND

Region monitoring can be used to determine when an electronic device (and/or a user associated with the electronic device) enters or exits a geographical region. Geofencing is one example of region monitoring and uses a geofence to define a geographical region of interest. For example, a geofenced area or region can be created to have various different sizes, shapes, geometries, etc., and monitored to determine when an electronic device cross a boundary of a geofenced region.

Detected crossings of a boundary of a geofenced region can be analyzed to determine whether the detected crossing represents an exit from the geofenced region (e.g., when the electronic device moves from the interior of the geofenced region to the exterior of the geofenced region) or an entry into the geofenced region (e.g., when the electronic device moves from the exterior of the geofenced region to the interior of the geofenced region). In some examples, detected crossings of a boundary of a geofenced region can be stored and/or analyzed against previously detected boundary crossings to determine whether an electronic device has entered or exited the geofenced region. Detected boundary crossings of a geofenced region can additionally, or alternatively, be used to perform one or more subsequent tasks, which are often location-related tasks.

For example, geofencing can be used in the context of mobile computing devices, including (but not limited to) smartphones, tablet computers, laptops, smart watches, wearables, etc. Mobile computing devices can include one or more geofencing systems to perform region monitoring with respect to the movement and location of the mobile computing device and/or a user of the mobile computing device (e.g., in scenarios in which the user carries or wears the mobile computing device, such that the location of the user and the location of the mobile computing device can be taken to be the same). For example, a mobile computing device can include a geofencing system that utilizes location information determined using a GPS (Global Positioning System) receiver, a GLONASS (Global Navigation Satellite System) receiver, and/or one or more other components integrated or associated with the mobile computing device.

SUMMARY

In some examples, systems and techniques are described for improved geofence registration for automatic detection of geographic region crossings. In accordance with at least one embodiment, a method is provided, the method including: registering a first geofence encompassing a first area, wherein the first area is associated with a first location coordinate; generating a composite geofence encompassing a refined geofence area that is a subset of the first area, wherein: the composite geofence includes the first geofence and one or more additional geofences; and each of the one or more additional geofences is registered using an offset relative to the first location coordinate; determining an occurrence of a geofence event for at least one of the one or more additional geofences; and generating, based on the occurrence of the geofence event for at least one of the one or more additional geofences, an exit notification for the refined geofence area of the composite geofence.

In another example, the geofence event comprises an entry determination or an exit determination for at least one of the one or more additional geofences In another example, the refined geofence area comprises a union of the one or more additional geofences.

In another example, the method further comprises generating the composite geofence in response to obtaining an entry determination for the first geofence In another example, the first geofence and the one or more additional geofences have a same size and encompass a same amount of area.

In another example, generating the composite geofence comprises: registering a first additional geofence using a first offset; registering a second additional geofence using a second offset; registering a third additional geofence using a third offset; and registering a fourth additional geofence using a fourth offset; wherein the first offset, second offset, third offset and fourth offset each include a displacement value relative to the first location coordinate and an angular direction relative to the first location coordinate.

In another example, the first offset, second offset, third offset and fourth offset each include a same displacement value and a different angular direction.

In another example, the first offset, second offset, third offset and fourth offset include angular directions separated by 90 degrees.

In another example, generating the composite geofence further comprises generating a first geofence refinement layer, wherein the first geofence refinement layer includes each of the one or more additional geofences.

In another example, generating the composite geofence further comprises generating a second geofence refinement layer, wherein the second geofence refinement layer includes one or more second additional geofences, each second additional geofence offset from the additional geofences of the first geofence refinement layer.

In another example, the method further comprises removing the one or more additional geofences in response to obtaining an exit determination for the first geofence.

In one example, a system is provided that includes a memory (e.g., configured to store data, such as audio data, etc.) and one or more processors (e.g., implemented in circuitry) coupled to the memory. The one or more processors are configured to and can: register a first geofence encompassing a first area, wherein the first area is associated with a first location coordinate; generate a composite geofence encompassing a refined geofence area that is a subset of the first area, wherein: the composite geofence includes the first geofence and one or more additional geofences; and each of the one or more additional geofences is registered using an offset relative to the first location coordinate; determine an occurrence of a geofence event for at least one of the one or more additional geofences; and generate, based on the occurrence of the geofence event for at least one of the one or more additional geofences, an exit notification for the refined geofence area of the composite geofence.

In one example, a non-transitory computer-readable medium is provided that has stored thereon instructions that, when executed by one or more processors, cause the one or more processors to: register a first geofence encompassing a first area, wherein the first area is associated with a first location coordinate; generate a composite geofence encompassing a refined geofence area that is a subset of the first area, wherein: the composite geofence includes the first geofence and one or more additional geofences; and each of the one or more additional geofences is registered using an offset relative to the first location coordinate; determine an occurrence of a geofence event for at least one of the one or more additional geofences; and generate, based on the occurrence of the geofence event for at least one of the one or more additional geofences, an exit notification for the refined geofence area of the composite geofence.

In one example, an apparatus is provided. The apparatus includes: means for registering a first geofence encompassing a first area, wherein the first area is associated with a first location coordinate; generating a composite geofence encompassing a refined geofence area that is a subset of the first area, wherein: the composite geofence includes the first geofence and one or more additional geofences; and each of the one or more additional geofences is registered using an offset relative to the first location coordinate; determining an occurrence of a geofence event for at least one of the one or more additional geofences; and generating, based on the occurrence of the geofence event for at least one of the one or more additional geofences, an exit notification for the refined geofence area of the composite geofence.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope (nor necessarily to be considered as drawn to scale), the principles herein are described and explained with additional specificity and detail through the use of the accompanying drawings in which.

DETAILED DESCRIPTION

Figure 1:
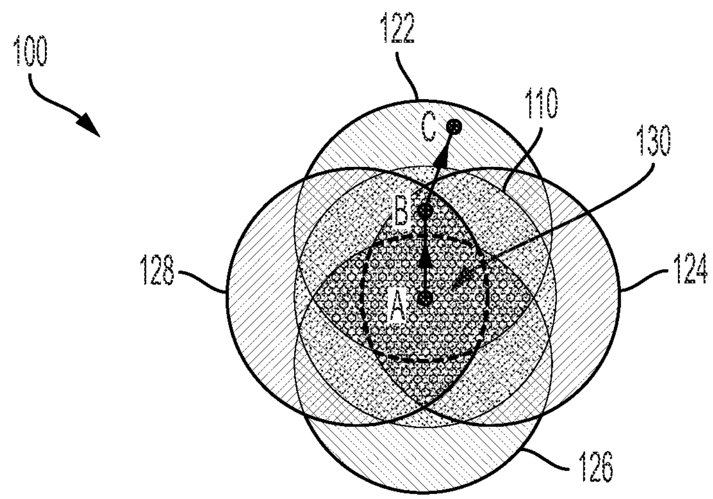
FIG. 1 depicts an example composite geofence and resulting refined geofence area.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. It will be appreciated that for simplicity and clarity of illustration, where appropriate, reference numerals have been repeated among the different figures to indicate corresponding or analogous elements. The description is not to be considered as limiting the scope of the embodiments described herein.

In general, a geofence registration process can involve establishing a virtual perimeter (e.g., a geofence perimeter) within a real-world geographical area. Geofence registration can be considered a subset or initialization process of a broader geofencing technique. As mentioned previously, geofencing is often performed in order to unobtrusively and automatically detect when objects and/or individuals move across a geofence perimeter (e.g., the virtual perimeter surrounding a geofenced area). For example, geofencing can be used to automatically generate indications, alerts, determinations, etc., that an object or individual being monitored by a geofencing technique has either entered a geofenced area or departed a geofenced area. A distinction can be made between entry into a geofenced area and exit from a geofenced area based at least in part on the direction of movement and/or subsequent location of the object or user (and associated electronic device) after triggering the geofence perimeter. In some embodiments, geofencing can be performed based on one or more geofence triggers, which are indications or determinations that a geofence perimeter has been crossed. The detection of a direction of movement and/or subsequent location, and hence the determination of whether a geofence trigger represents an entry or an exit, can, for example, be determined by a smartphone or other user computing device having location capabilities.

In some embodiments, geofences can be constructed with respect to one or more reference points. For example, a circular geofence can be constructed (e.g., a virtual geofence perimeter can be established in a geofencing system provided on or associated with an electronic device) around a desired location, such as a home or school, given a coordinate or other location information for the desired center point of the circular geofence. In some embodiments, geofence construction can also be performed based on one or more geometric parameters of the desired geofence. For example, in the context of constructing a circular geofence, a geofence construction request can include a coordinate of the desired center point of the circular geofence (e.g., as mentioned above) and optionally, can further include a specified radius of the circular geofence. More complex geometric shapes can also be utilized, defined, and/or configured when constructing a geofence, as would be appreciated by one of ordinary skill in the art. For ease of illustration and clarity of explanation, the following discussion makes reference to example geofences that are circular in nature—that is, defined by a center coordinate and a characterizing geometric parameter such as a radius. However, it is appreciated that various other geofence geometries, construction methodologies, geometric parameters, characterizing geometric parameters, etc., can be utilized without departing from the scope of the present disclosure.

As mobile computing devices (including, but not limited to, smartphones, cellular phones, tablet computers, wearables, smart watches, laptops, other portable computers, etc.) continue to increase in terms of widespread usage and ownership, the ability to register and utilize geofences for specific individuals, objects, devices, etc., has become an increasingly attractive capability. This is based at least in part on the fact that these mobile computing devices, typically worn or carried by an individual, are capable of providing accurate, real-time location information that can be used to infer the location of the corresponding user of the mobile computing device. This location information can be provided via a GPS (Global Positioning System) receiver or other hardware solution/component integrated with a user's mobile computing device, and can further include, but is not limited to, a GLONASS (Global Navigation Satellite System) receiver, a Bluetooth and/or NFC (Near Field Communication) transceiver, and/or an INS (Inertial Navigation System) sensor, etc.

Location information determined via hardware sensors or components on a user's mobile computing device can also be supplemented (or augmented entirely) with software-based location solutions. For example, a database can be maintained to track physical locations or coordinates corresponding to various Wi-Fi access points—by polling a user's mobile computing device to determine visible Wi-Fi access points and cross-referencing the response from the user device with the location database, an inferred location can be calculated for the user's mobile computing device even in the absence of a GPS signal. In some embodiments, one or more location or location-related services provided by a wireless network to which the mobile computing device is connected (e.g., a wireless cellular network) can be used to obtain location information associated with a user's mobile computing device. For example, location information can be determined based on radio frequency (RF) signals that are transmitted and received between two or more nodes, such as positioning reference signals (PRS) transmitted from a base station to a mobile computing device.

Regardless of how location information is obtained for a given user's mobile computing device, existing solutions to geofence implementation largely remain limited in terms of both their accuracy and their functionality by the relatively large minimum geofence radius that is required by the existing geofence solutions. For example, the native geofence capabilities available on some modern smartphones can be observed to provide a practical minimum geofence radius that can exceed 200 meters (660 feet), which quickly becomes problematic when attempting to register geofences for individual apartments or homes. The problems associated with large minimum geofence sizes in existing geofence solutions may be even further exacerbated in high-density urban environments, where a single city block might span only 100 meters (330 feet).

While various different smartphones and mobile computing devices can be associated with different specific implementations or capabilities with respect to the minimum usable geofence radius, a problem nevertheless remains in that users often want (and are unable) to create a geofence that is smaller than the minimum permissible size of a given geofencing system. Consequently, existing geofencing solutions may be unable to offer the level of granularity that is required to reliably register and utilize geofences around individual homes, buildings, and other locations having a footprint that is appreciably smaller than the minimum geofence radius of a given geofencing system. In this common scenario, in which the minimum geofence size/radius is too large to accurately trigger or detect when a user enters or exits a building (or other desired area for geofencing), the utility of geofencing services can rapidly degrade.

Accordingly, systems, apparatuses, processes (also referred to as methods), and computer-readable media (collectively referred to as "systems and techniques") are described herein for improved geofencing. The systems and techniques described herein can be used to implement the accurate registration and monitoring of significantly smaller and more granular geofenced areas. Notably, the systems and techniques can do so without decreasing an underlying minimum geofence radius itself, advantageously maintaining compatibility with existing smartphones, mobile computing devices, and geofencing systems.

In some embodiments, the use of a native geofence and/or native geofence registration system or service can provide a greater degree of certainty with respect to the validity of any given entry or exit trigger provided with respect to a given geofence, based at least in part on the ability of a native geofence system to more deeply integrate with location data and other sensed data ingested by the user's smartphone or other mobile computing device. For example, some native geofence systems will report a boundary crossing (e.g., exit or entry trigger) only once the user is determined to have passed several meters across or beyond a specified geofence boundary and has then remained beyond the specified geofence boundary for several seconds. However, this opaque calculation and generation of individual exit and entry triggers—while useful in terms of being able to trust the validity of any given trigger on its own—obscures the true size or radius of any given geofence registered via a native geofencing service. As will be described in greater depth below, aspects of the present disclosure address this problem, allowing the creation and utilization of refined, composite geofences that are not only smaller in size than a minimum native geofence size, but also mitigate or eliminate the uncertainty associated with native geofencing.

The disclosure turns now to FIG. 1, which depicts an example schematic representation of a composite geofence 100, according to aspects of the present disclosure. The composite geofence 100 is illustrated in FIG. 1 as including five separate geofences of an identical size (e.g., here, an identical radius because the five separate geofences are all circular geofences): a central geofence 110, four additional geofences 122, 124, 126, and 128. However, it is appreciated that various different numbers, shapes, sizes/radii, etc., may be utilized for one or more of the constituent geofences of a composite geofence such as composite geofence 100 without departing from the scope of the present disclosure. Additionally, the relative spacing and/or positioning between one or more of the constituent geofences and/or geofence layers of composite geofence 100 can be adjusted from that seen in the configuration of FIG. 1, likewise without departing from the scope of the present disclosure.

As mentioned previously, some existing geofencing solutions may often impose a minimum radius of approximately 200 meters (660 feet), which is too large for many use cases such as registering a geofence to detect when an individual leaves their home, school, or place of work. For sake of example, the following discussion makes continued reference to the example minimum geofence radius of 200 meters, although it is appreciated that the presently disclosed systems and techniques for improved geofence registration can be equally applicable to geofencing systems with larger or smaller minimum geofence radii or sizes. For example, a conventional geofencing solution having a minimum radius of 100 meters (330 feet) would in many cases also be too large for the same use cases listed above, e.g., when attempting to register a geofence for detecting when an individual leaves their home, school, or place of work.

With respect to FIG. 1, central geofence 110 can be taken to represent an example of a standard geofencing implementation (e.g., a geofencing implementation that is based on or otherwise uses only a single geofence sized according to the minimum geofence radius). In this conventional use case, central geofence 110 can be centered around a desired location or coordinate for geofencing (e.g., a user's home) in order to detect when the user enters or exits the home. The minimum detectable area in which central geofence 110, when taken alone, is able to detect or trigger these user movements is equal to the area of central geofence 110 itself. In other words, a geofencing system implementing only central geofence 110 can only be used determine whether a user has entered the geofenced area equal to the circular area enclosed by central geofence 110 or has exited this same circular, geofenced area.

In one illustrative example, the systems and techniques described herein can utilize the additional geofences/geofence layers 122, 124, 126, 128 to generate the composite geofence 100. As illustrated, composite geofence 100 is associated with a smaller minimum detectable area in which geofencing can be performed (e.g., a smaller actionable geofenced area in which users entering or exiting the geofenced area can be detected or otherwise trigger a notification). For example, the actionable geofence area of composite geofence 100 can be given as a refined geofence area 130, which is significantly reduced in size from that of central geofence area 110 (e.g., because the actionable geofence area of central geofence 110 is the same as the overall area of central geofence 110). Notably, this reduction in the detectable or actionable minimum geofence area of composite geofence 100 can be achieved without any reduction in the minimum geofence radius itself—all four of the additional geofences 122, 124, 126, 128 are illustrated as having the same minimum radius (i.e., 200 m) as central geofence 110.

As mentioned above, in the example of FIG. 1, the increased granularity of geofence detection associated with composite geofence 100 can be achieved by calculating refined geofence area 130 as the union of at least the four additional geofences 122, 124, 126, and 128. In some embodiments, the refined geofence area 130 can be calculated as the union of all five constituent geofences of composite geofence 100 (e.g., central geofence 110 and additional geofences 122-128), although it is noted that in the example of FIG. 1, refined geofence area 130 can be the same when calculated as the union of the four additional geofences 122-128 as when calculated as the union of central geofence 110 and the four additional geofences 122-128. In general, the precise manner of configuration and geometric layering/alignment between central geofence 110 and one or more additional geofences (e.g., the four additional geofences 122-128) can determine the resultant characteristics of refined geofence area 130 (e.g., size, area and/or shape).

In operation, it is noted that composite geofence 100 (and/or the overall layered composite geofence approach of the systems and techniques described herein) can be utilized to provide improved granularity in detecting or registering users both entering and exiting from refined geofence area 130. For clarity of explanation, the following discussion makes reference to scenarios in which refined geofence areas are utilized in the context of detecting user departures/egress from a geofenced location, although one of ordinary skill in the art would appreciate that user arrival/entry to a geofenced location can be achieved in an appropriately reversed manner (e.g., an exit can be inferred when a user generates an exit trigger from one geofence; an entry can be inferred when a user generates an entry trigger for all of the geofences—although it is appreciated that various other exit and entry determination calculations can be utilized without departing from the scope of the present disclosure).

Given that refined geofence area 130 can be calculated as the union of one or more constituent geofences of composite geofence 100 (e.g., the union of a group of geofences including one or more of central geofence 110 and additional geofences 122-128) that are layered around the desired detection point, several different analytical schemes can be utilized to make a determination that a user has exited (or entered) refined geofence area 130.

For example, before a user exits refined geofence area 130 (e.g., while the user remains within the house, apartment, building or other coordinate/location around which refined geofence area 130 is registered), the user can be determined to be located within all four of the additional geofences 122, 124, 126, 128. It is also noted that, when central geofence 110 is included in composite geofence 100, the user would at this time also be located within central geofence 110. As will be described in greater depth below, once the user exits refined geofence area 130, at least one of the individual (e.g., constituent) geofences of composite geofence 100 will trigger an alert indicating that the user has exited that particular geofence. Subsequently, as the user moves further away from his or her starting location within refined geofence 130, additional geofences of composite geofence 100 can also trigger exit alerts, which can be analyzed to determine additional movement and/or location information of the user with respect to composite geofence 100.

For example, assume that a user begins at point A, shown in FIG. 1 as being located within refined geofence area 130. In particular, point A is illustrated as the central coordinate around which both central geofence 110 and the layered multi-geofence construction of composite geofence 100 are located (e.g., a home, apartment, or other area to be monitored using composite geofence 100 and/or refined geofence area 130). This central coordinate can be automatically determined; selected from one or more pre-determined options; manually entered by a user as a coordinate or location name; manually entered by a user by dropping a pin or otherwise selecting a point on a scrollable map view or GUI, etc.

When the user location is determined to be at point A, the user remains within all five of the geofences shown in FIG. 1. As the user subsequently moves from point A (located within the house/refined geofence area 130) to a point B (located outside of the house/refined geofence area 130), an exit alert is triggered for geofence 126 but none of the four other geofences 110, 122, 124, 128. In some examples, the exit alert triggered by a user moving from point A to point B can be considered a sub-alert of composite geofence 100. For example, an exit alert for composite geofence 100 can indicate that a user has exited composite geofence 100 completely (e.g., is not located within the geofenced area of any of the constituent geofences of composite geofence 100). A sub-alert of composite geofence 100 can indicate that a user has only partially exited composite geofence 100 (e.g., the user is not located within one or more of the constituent geofences of composite geofence 100, but is still located within one or more of the remaining constituent geofences of composite geofence 100).

As the user then moves from point B to point C, additional exit alerts can be triggered for the additional geofences 124 and 128 (and an exit alert can additionally be triggered for the central geofence 110, when central geofence 110 is included in the construction of composite geofence 100). These additional exit alerts associated with the user movement from point B to point C can be generated in addition to the previous exit alert triggered for geofence 126, which was described immediately above in association with the user movement from point A to point B. The exit alerts triggered for the geofences 124, 126 and 128 can result from the fact that point C is located only within geofence 122—accordingly, the expected system action can be to trigger exit alerts for the remaining geofences of composite geofence 100.

In some embodiments, a single exit trigger generated by or in association with one or more of the constituent geofences of composite geofence 100 (e.g., one of the geofences 122-128, and optionally, central geofence 110) can be utilized as an indication, notification, or determination that a user has exited refined geofence area 130. In some embodiments, multiple exit triggers (e.g., from two or more constituent geofences of composite geofence 100) can be utilized to make a determination that a user has left area of refined geofence 130. In other words, in some embodiments, a determination can be made that a user has exited refined geofence area 130 of composite geofence 100 in response to receiving an exit trigger from any one of the constituent geofences 122-128 (and optionally, geofence 110). In some embodiments, a determination that a user has exited refined geofence area 130 can require multiple exit triggers to be received (e.g., an exit trigger must be received from at least two of the constituent geofences of composite geofence 100).

For example, when any single exit trigger is sufficient to cause a determination that a user has exited refined geofence area 130, the single exit trigger generated in associated with geofence 126 when a user moves from point A to point B would cause a determination that the user has exited refined geofence area 130. However, when multiple exit triggers are required for a determination that a user has exited refined geofence area 130, the single exit trigger associated with geofence 126 and the movement from point A to point B would not cause a determination that the user has exited refined geofence area 130.

In some examples, utilizing multiple exit triggers to determine egress from refined geofence area 130 can increase the accuracy or certainty of exit determinations generated in association with composite geofence 100, but at the expense of less granularity and/or slower reaction times by the geofencing system. The use of multiple exit triggers can be associated with decreased granularity and/or increased geofencing system reaction times given that the shape of refined geofence area 130 depends to some extent on the number of exit triggers utilized in making an exit determination for composite geofence 100. For example, requiring two exit triggers would change the shape of refined geofence area 130 from the circle shown in FIG. 1 to also include the areas where four of the five individual geofences overlap—such that the requirement of two exit triggers would result in refined geofence area 130 being star-shaped (e.g., with additional areas added in the North, South, East, and West directions).

In other words, when a single exit trigger is used to generate an exit determination for composite geofence 100, the refined geofence area 130 (e.g., the area that is geofenced by composite geofence 100 using a single exit trigger) can be determined as the union of all five of the individual geofences 122-128 and 110. When two exit triggers are used to generate an exit determination for composite geofence 100, the refined geofence area 130 may instead be determined as the union of all five geofences 110 and 122-128 plus each area representing the union of any four of the five geofences 110, 122-128. Accordingly, increasing the number of exit triggers used to generate an exit determination for composite geofence 100 can increase the geofencing accuracy by reducing false alarms, but can also increase the total geofenced area associated with or enclosed by refined geofence area 130.

The disclosure turns now to FIGS. 2-5, which illustrate various configurations of geofences and composite geofences, in accordance with the systems and techniques described herein. In some examples, FIGS. 2-5 can represent the stages or progression of constructing or otherwise registering a composite geofence with a refined geofence area (e.g., such as composite geofence 100 with refined geofence area 130, described above with respect to FIG. 1), although it is again noted that each of FIGS. 2-5 can also be viewed in standalone fashion as representing different examples of a composite geofence.

Once again, it is noted that for clarity of illustration, the individual geofences depicted in FIGS. 2-5 are shown as being of a substantially similar size and shape. However, it is appreciated that the individual geofences can be configured or otherwise provided in various different sizes, shapes, and/or quantities, all without departing from the scope of the present disclosure. For example, in some embodiments, one or more individual geofences can be included in each layer of additional geofences arranged around a central coordinate of the composite geofence. In some examples, a symmetric arrangement of four additional geofences around a central coordinate (such as the star/flower shaped composite geofences of FIGS. 1 and 4) can be utilized to detect exit triggers in any direction away from the central coordinate—hence, the four additional geofences are utilized to correspond to each of the four cardinal directions.

In some embodiments, an exit identification (also referred to as an exit determination or an exit trigger of the composite geofence) may only be desired for a certain or single direction. For example, a user's apartment building might only have a single exit to the North (e.g., located where the front doors of the apartment building lead out to the street or sidewalk). Accordingly, in this example, only a single additional geofence, positioned in the North or positioned with a relative offset to the North, might be utilized in a given layer of the presently disclosed composite geofence(s). In this example, the additional user movement and location information that can be determined by registering geofences in the East, South, and West is likely unnecessary, given the lack of doors and other physical exit options for the user to take in those directions.

Figure 2:
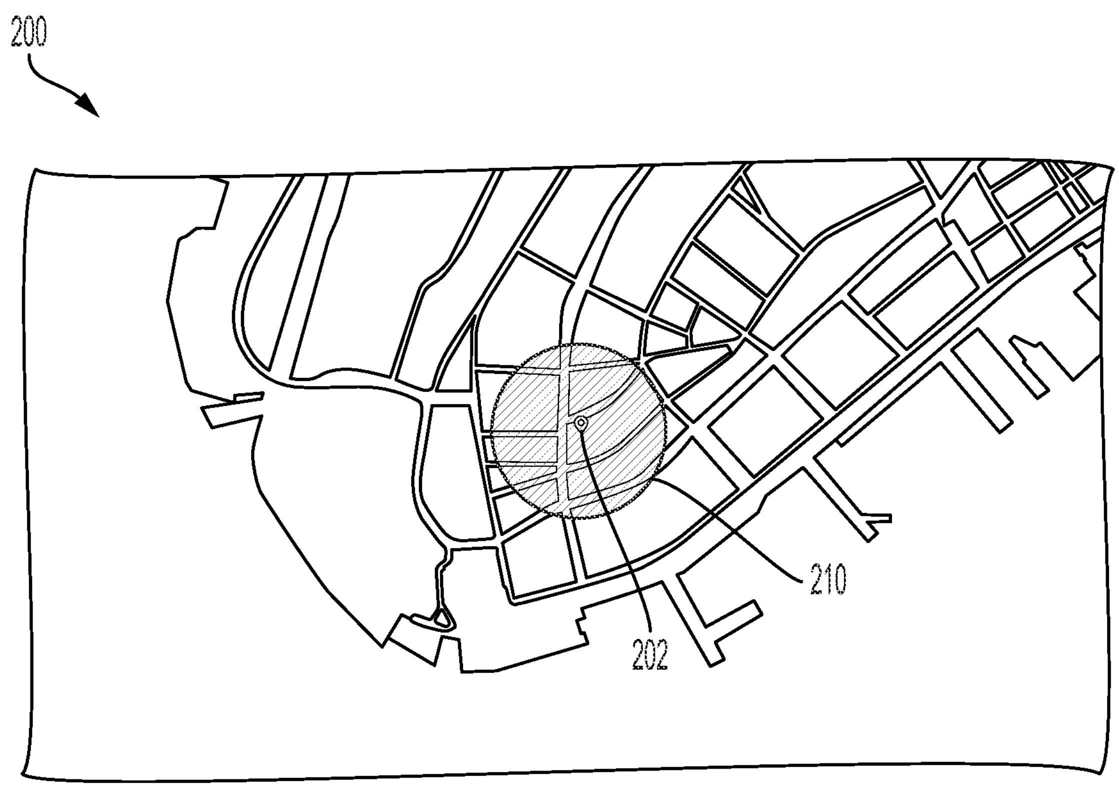
FIG. 2 depicts an example of a single central geofence.

Turning now to FIG. 2, a diagram 200 is illustrated, depicting a single geofence 210 (also referred to as central geofence 210) which is shown here as being circular in shape and registered around a central coordinate 202. Geofence 210 is overlaid on a map representation of a particular geographic area (e.g., a real-world location) in which the virtual geofence boundaries of geofence 210 can be applied. For example, the interior (e.g., enclosed) area of geofence 210 can visually indicate or otherwise represent the extent and/or location of geofence 210 in the context of the geographic area of the map representation included in FIG. 2.

In some embodiments, central coordinate 202 can be provided as the dynamic location associated with a user or other entity for which the geofence 210 is initially (or, in some embodiments, currently) registered. For example, central coordinate 202 could be obtained as the current location associated with a child, such that an exit alert will be triggered if the child moves sufficiently far away from the location represented by central coordinate 202. In some embodiments, central coordinate 202 can be provided by or obtained as the static location of a house or other building for which it is desired to place a geofence around. For example, central coordinate 202 could be obtained as a GPS coordinate of a playground, sports field, friend's house, etc., such that an exit alert will be triggered if the child moves sufficiently far away from that static location.

In other words, it is contemplated herein that one or more geofences can be initially registered or generated based on a dynamic location coordinate, such as the real-time GPS-based location of a smartphone or other electronic device associated with a user or object for which location monitoring is to be performed using the registered geofence. In some embodiments, one or more geofences can be initially registered or generated based on a static or pre-defined location coordinate. These static location coordinates can also be GPS coordinates, or otherwise provided in a same or similar format as the dynamic location coordinates that can be obtained from a GPS receiver or location module of a smartphone or other computing device. However, the static location coordinates can be obtained from a database or other data store, using for example an identifier such as 'Home,' 'Work,' 'School,' 'Park,' etc. In some embodiments, geofence registration can be performed using a combination of both dynamically determined real-time location coordinates and static, pre-determined location coordinates obtained using a lookup process.

In some examples, a geofence can be registered or otherwise defined using one or more coordinates (e.g., such as central coordinate 202 of geofence 210) that are dynamically changing over time. For example, a dynamically changing central geofence coordinate can be provided such that the central geofence coordinate updates to the current location associated with a user in response to a determination that the user has remained stationary for a pre-determined amount of time (e.g., 30 minutes), thereby automatically registering a geofence that will trigger an exit alert when the user moves sufficiently far away from a location in which they had previously remained stationary. In some embodiments, a geofence can be registered or otherwise defined using one or more geofence parameters that change dynamically in response to factors such as the current time, a known calendar or schedule associated with a user being monitored with the geofence, an elapsed time of the user remaining stationary, a current location of the user, etc. For example, as was previously discussed above, a geofence can be associated with geometric parameters (e.g., which relate to one or more aspects of the geofence's size, shape, or geometry) and/or characterizing geometric parameters (e.g., which are sufficiently to completely characterize or determine the final size, shape or geometry of a geofence when combined with the geofence's central coordinate). In one illustrative example, a circular geofence can be registered such that the geofence radius dynamically changes based on the time of day and/or current location associated with a user being monitored by the geofence. For example, if the user being monitored is a child, the geofence radius can automatically increase when the central coordinate of the geofence is located within (or near) a park or school and can automatically decrease when the central coordinate of the geofence is located within (or near) the child's home. In some examples, the geofence radius may automatically increase during daylight hours and automatically decrease outside of daylight hours. It is noted that the above examples are provided for purposes of example and illustration only, and are not intended to be construed as limiting—various other geofence construction or registration approaches, techniques, rules, dynamic conditions, etc., can be utilized without departing from the scope of the present disclosure.

As discussed previously, the minimum geofence radius can significantly impact the usability and accuracy of a corresponding registered geofence (e.g., the usability and accuracy of a given geofence can depend on the minimum geofence radius available). Consider the two examples above, both of which note that an exit alert will be triggered once the child moves sufficiently far away. Conventional geofence solutions do not offer suitable solutions for the increasingly common scenario in which the desired trigger distance for a geofence (e.g., in the context of FIG. 2, the point at which the child has moved sufficiently far away from central coordinate 202) is smaller than the minimum radius of the geofence itself. For example, note that geofence 210—illustrated in FIG. 2 as having the common 200 m minimum geofence radius—spans over three city blocks on each side. At this size, geofence 210 is not well suited for providing exit alerts and other granular geofence functionalities for locations such as schools, homes, or other buildings that are significantly smaller than even just one city block. Accordingly, additional geofence layers can be registered (e.g., in combination with geofence 210) in order to generate a composite, refined geofence with a smaller minimum geofence radius over which exit alerts or exit determinations can be determined, according to aspects of the present disclosure.

Advantageously, in some embodiments one or more additional geofence layers can be utilized in combination with a single, conventional geofence such as geofence 210—meaning that the presently disclosed composite geofences can be seamlessly integrated with existing geofencing systems and interfaces without disruption or modification to the user experience and/or interface. In other words, because the composite geofences described herein can be configured as an extension (rather than replacement) of existing or standalone geofences such as geofence 210, in some embodiments the composite geofences can be registered or generated on an as-needed or real-time basis. For example, geofence 210 can be registered or otherwise implemented as a persistent geofence, with additional geofence layers dynamically registered (e.g., to create a composite geofence) and un-registered (e.g., to revert to standalone geofence 210) as needed. In some cases, additional geofence layers can be dynamically registered in response to detecting a user entry into the standalone geofence 210, thereby providing a composite geofence with a refined detection area for determining user egress. Upon detecting user egress from the composite geofence, the additional geofence layers can subsequently be un-registered, either immediately or after a pre-determined elapsed time.

In some examples, a composite geofence can be automatically generated for one or more standalone geofences. For instance, a composite geofence can be automatically generated and applied to refine the detection area of an existing (e.g., standalone) geofence. As will be described in greater depth below, the standalone geofence for which a composite geofence is generated and applied can be manually selected, automatically selected, or a combination of the two. For example, returning briefly to composite geofence 100 illustrated in FIG. 1, a user can specify or otherwise provide input for registering only central geofence 110, at which point the four additional geofence layers 122, 124, 126, and 128 can be automatically registered in order to generate composite geofence 100 and the refined geofence area 130.

In some embodiments, a process for automatically registering additional geofence layers for a composite geofence can utilize one or more offset distances, wherein the offset distances specify locations of additional geofence layers relative to a central coordinate of an existing geofence (e.g., central coordinate 202 of geofence 210). For example, the offset distance can be calculated between central coordinate 202 and the central coordinate of each additional geofence that is to be registered. The offset distance can additionally, or alternatively, be calculated between central coordinate 202 and an outer perimeter of each additional geofence. In some cases, an offset distance can be calculated between an arbitrary point associated with an existing geofence (e.g., geofence 210) and another arbitrary point associated with the additional geofence that is to be registered, given sufficient relational information between the two arbitrarily selected points.

In some embodiments, offset information between additional geofences and an existing geofence can be provided in an angular form (e.g., registering four additional geofences each centered at a distance of 100 m from central coordinate 202 and at angles of 0°, 90°, 180°, and 270° would yield the same composite geofence geometry depicted in FIG. 1).

In some embodiments, offset information can be provided in a scalar form (e.g., registering four additional geofences by summing the [x, y] value of central coordinate 202 with the scalar offsets $[x_1, y_1]$, $[-x_1, y_1]$, $[x_1, -y_1]$, $[-x_1, -y_1]$, respectively). It has previously been noted that the additional geofences do not have to be of the same size or shape as the central geofence 210. It is additionally noted that the additional geofences do not have to be symmetrically arranged about the central geofence 210—one or more of the additional geofences can instead be registered in an asymmetric fashion without departing from the scope of the present disclosure.

Figure 3:
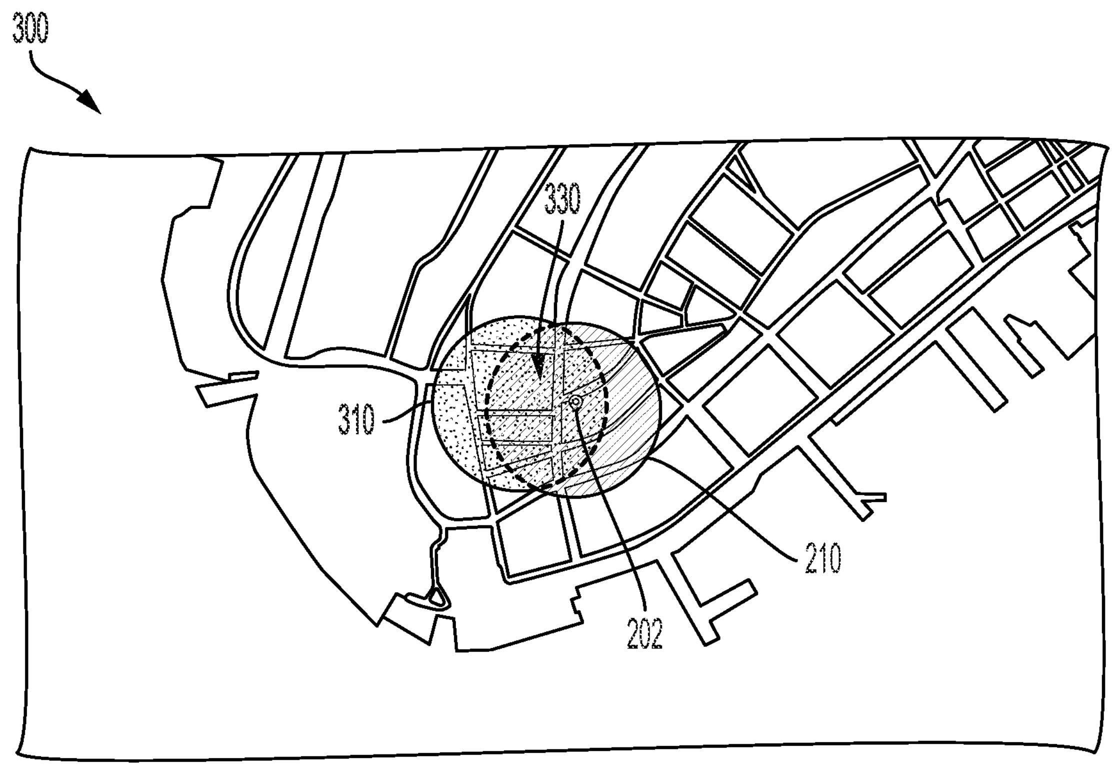
FIG. 3 depicts an example composite geofence comprising the central geofence of FIG. 2 augmented with one additional geofence.

Returning to the progression of registering additional geofences (e.g., geofence layers) in order to create successively smaller refined geofence areas, depicted in FIG. 3 is an additional geofence 310 that can be registered to supplement the central geofence 210 of FIG. 2. Here, additional geofence 310 is of the same size and shape as central geofence 210 (e.g., both are circular and have a radius approximately equal to the minimum geofence radius of approximately 200 m), although it is again noted that various different sizes, shapes, and combinations thereof can be utilized in registering a composite geofence, without departing from the scope of the present disclosure. As illustrated, geofence 310 is centered about a coordinate that is offset approximately 100 m to the left/East (e.g., 270°) of central coordinate 202.

By adding the additional geofence 310 to the left/East of central coordinate 202 of central geofence 210, the resulting composite geofence 300 (e.g., which includes geofences 210 and 310) can more quickly identify exits to the opposite side—here, the right side/West of central coordinate 202. More particularly, by calculating a refined geofence area 330 as the union or overlapping portion between central geofence 210 and additional geofence 310, it is seen that the addition of a single additional geofence can significantly reduce the size of the detectable or actionable geofence area 330 in comparison to that of central geofence 210. For example, consider a scenario in which an individual is located at central coordinate 202 and begins moving to the right (e.g., moving East). When composite geofence 300 is used, an exit alert would be generated as soon as the individual crosses the boundary given by refined geofence area 330, slightly to the right of central coordinate 202. However, if only the standalone geofence 210 is used, an exit alert would not be generated until the individual crosses the eastern boundary associated with geofence 210, a full 200 m to the right of central coordinate 202.

In some embodiments, the registration of additional geofence 310 in combination with geofence 210 can be used to improve geofencing accuracy and reduce the size of the detectable (e.g., actionable) geofenced area for movements to the right/East of central coordinate 202. Similar improvements can be achieved by registering additional geofences for refining the other directions of movement away from central coordinate 202 (e.g., up, down, left; North, South, West; 0°, 180°, 270°; etc.).

Figure 4:
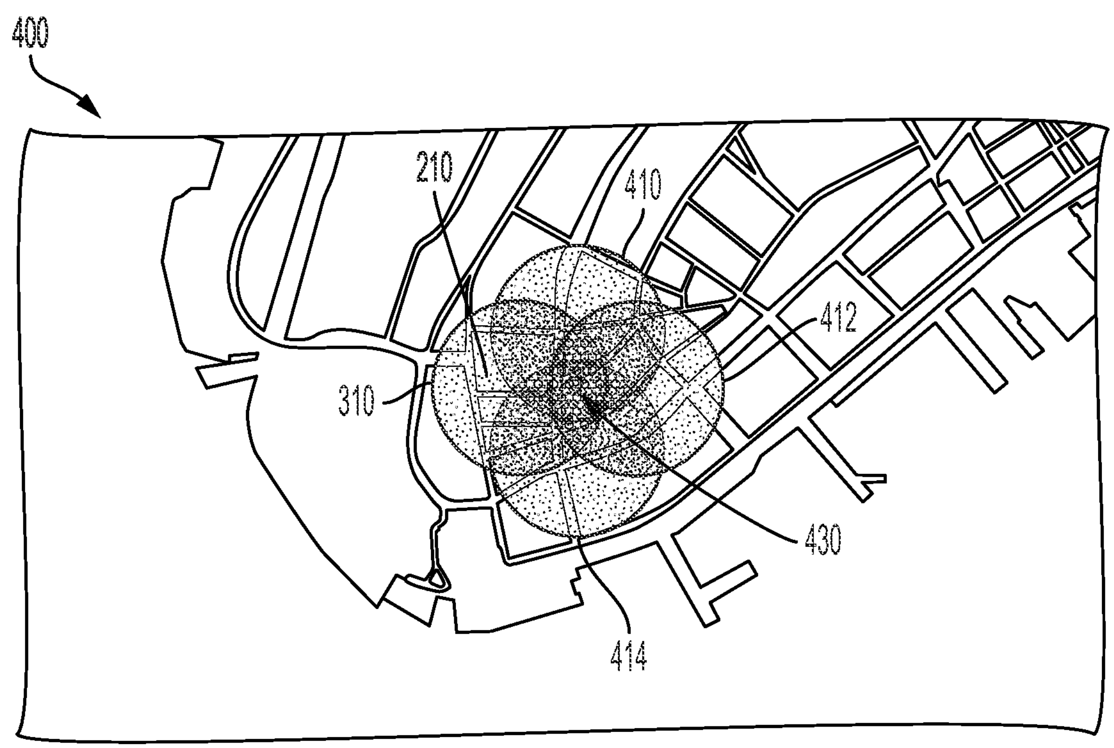
FIG. 4 depicts an example composite geofence comprising the central geofence of FIG. 2 augmented with four additional geofences.

An example of one such resulting composite geofence 400 is illustrated in FIG. 4. In some examples, FIG. 4 is overlaid on a map representation of the same geographic area (e.g., real-world location) as was depicted in and described above with respect to FIGS. 2 and 3. As illustrated, the composite geofence 400 of FIG. 4 can include central geofence 210 and additional geofence 310 (e.g., of FIGS. 2 and/or 3, as described above) along with three further, newly added additional geofences 410, 412 and 414.

Whereas the additional geofence 310 was offset in the left/East direction from the central coordinate 202 of central geofence 210, the additional geofences 410-414 can be offset in different directions relative to central coordinate 202. For example, additional geofence 410 is offset in the up/North direction from central coordinate 202; additional geofence 412 is offset in the right/East direction from central coordinate 202; and additional geofence 414 is offset in the down/South direction relative to central coordinate 202. Each of the three newly added additional geofences 410, 412 and 414 is shown having the same distance offset of ~100 m from central coordinate 202, as was utilized when registering the first additional geofence 310. However, it is noted that the additional geofences 310, 410, 412, and/or 414 can have a distance offset that is greater or lesser than 100 m and moreover, can be registered in various combinations of different distance offsets. For example, although not illustrated, it is contemplated that the four additional geofences 310, 410, 412 and 414 can be registered using between one and four different distance offsets relative to central coordinate 202, without departing from the scope of the present disclosure.

In operation, the composite geofence 400 of FIG. 4 can provide a significantly smaller detectable (e.g., actionable) geofenced region than that associated with either the standalone central geofence 210 or the composite geofence 300. For example, FIG. 4 illustrates the detectable geofenced region associated with composite geofence 400 as a refined geofence area 430. In some embodiments, refined geofence area 430 can be determined as the union of the four additional geofences 310, 410, 412, 414. In some embodiments, central geofence 210 can be optionally included in composite geofence 400, such that refined geofence area 430 is the union of all five geofences 210, 310, 410, 412, 414—however, reference is made below to a scenario in which refined geofence area 430 is the union of the four geofences 310, 410, 412 and 414, with the understanding that the associated description can also be applied to the scenario in which refined geofence area 430 further includes the central geofence 210 in the calculated union.

For an individual located inside of refined geofence area 430, an exit alert or notification can be generated in response to a single one of the four constituent geofences (e.g., 310, 410, 412 or 414) being triggered. In some embodiments, the exit alert or notification can be generated based on the logic that if the individual is no longer located inside a given one of the constituent geofences, then the user must not be located inside of the refined geofence area 430, which is the union of all four of the constituent geofences. In other words, an exit trigger from one of the constituent geofences 310, 410, 412 or 414 is inconsistent with the four-way union condition used to determine that an individual is still located inside of refined geofence area 430.

As illustrated, in comparison to the single, central geofence 210 (illustrated as spanning over three city blocks), the refined geofence area 430 that is provided by composite geofence 400 is fully functional over an area that is less than one city block in size. Notably, this dramatic improvement in both granularity and geofence size is achieved without reducing the minimum radius of the constituent geofences themselves—all five of the geofences seen in FIG. 4 have the same, relatively large 200 m radius, but work in combination to achieve a minimum refined geofence area 430 that is much smaller in size.

Figure 5:
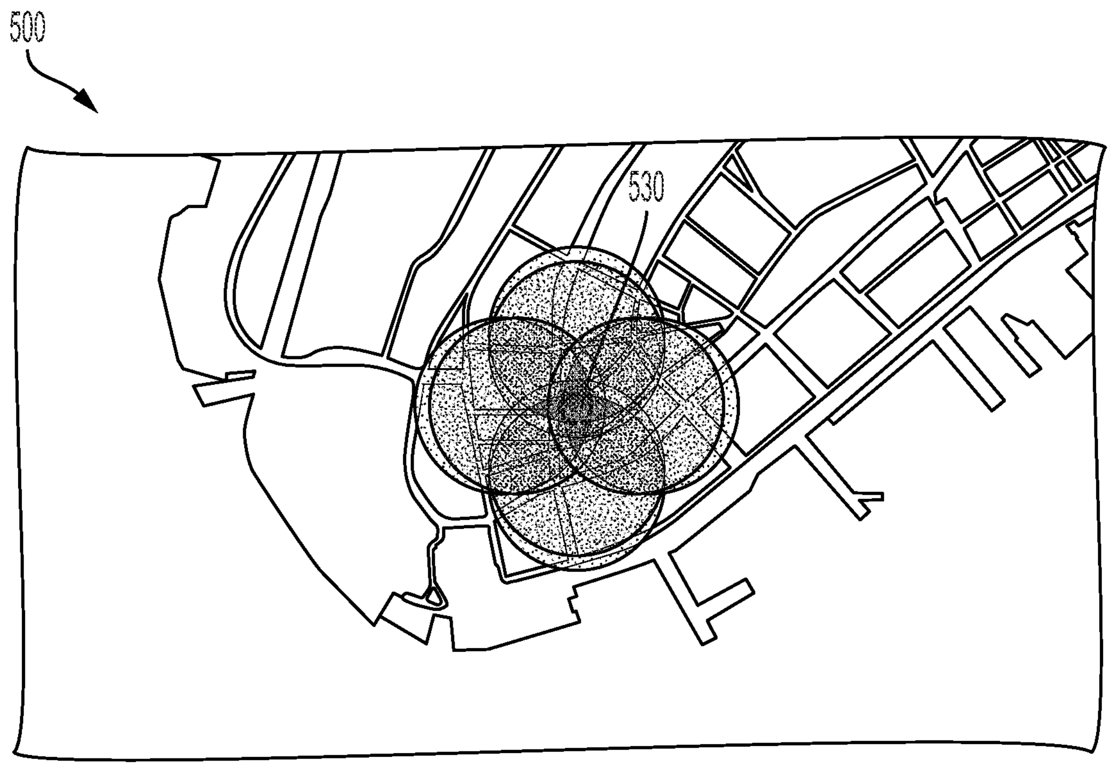
FIG. 5 depicts an example composite geofence comprising the composite geofence of FIG. 4 further augmented with a further layer of four additional geofences.

Still further decreases to the minimum refined geofence area can be achieved via the registration of a greater number of additional geofences/geofence layers, as illustrated in FIG. 5, which extends the composite geofence 400 of FIG. 4 to generate a composite geofence 500 with four more additional geofences (not labeled). As illustrated, composite geofence 500 can be used to provide a refined geofence area 530 that is significantly smaller than even the refined geofence area 430 that was described above. In some examples, the creation or registration of multiple layers of additional geofences can be useful not only in reducing the size of the refined geofence area, but also in situations in which the location of an individual cannot be precisely determined and/or in which a precise radius/size of individual geofences is unknown and/or changing (e.g., the average minimum geofence radius might be 200 m, but in practice, individual geofences might have radii of 190 m and 200 m, for example, and this information may not be reported or immediately made available by a smartphone or other geofencing device/system associated with the individual geofences).

For instance, with respect to uncertainty of location, geofence systems may commonly infer a user's location based on a location that is returned by the user's smartphone or other computing device equipped with a location sensor or module. The accuracy and/or uncertainty of the location provided by the user's computing device can vary depending on a number of different factors, including the visibility of the device to GPS satellites or other external positioning equipment and systems. Accordingly, it is not always possible to ensure that, at the time of registering the additional/constituent geofences of a composite geofence, the user will in fact be located inside of each registered geofence.

As such, when an additional geofence is registered without capturing the user inside of its boundaries, that particular geofence may "miss" a user exit—when a user is outside of a geofence to begin with, that geofence cannot generate the exit trigger that is utilized by the composite geofence as a whole to determine that the user has left the refined geofence area. In some embodiments, to mitigate this issue, multiple different geofences and/or geofence layers (e.g., at different offset distances from center coordinate 202) can be utilized as illustrated in composite geofence 500 of FIG. 5.

For example, in the context of FIG. 5, it can be seen that if a certain additional geofence "misses" the detection of a user exit (e.g., because the additional geofence is registered such that the user is outside of its bounds to begin with), then a subsequent geofence layer can still detect or identify a user exit—based on an exit trigger from the subsequent geofence layer, the composite geofence 500 can still generate an exit notification for the refined geofence area 530 much more quickly than the single, central geofence 202 would on its own. In some embodiments, the multiple layers can be utilized to generate confidence levels or impart other certainty assessments to the generation of user exit notifications—for example, an exit trigger from a first or an innermost layer of a set of additional geofences (e.g., a set of additional geofences registered in alignment along the same angular direction or line extending from a central coordinate of the composite geofence 500, with relatively small distance offsets therebetween) can be used as a "possible crossing" indication, while an exit trigger from a second or outermost layer of additional geofences can be used as a confirmation or "confirmed crossing" indication.

In this manner, a plurality of additional geofences/geofence layers can be extended in combination with a single, central geofence 210 until the union of the various geofences (e.g., the refined geofence area of the resulting composite geofence) is of a desired size and/or shape. A wide variety of different sizes and shapes can be achieved with the appropriate combination of individual, constituent geofences, without departing from the scope of the present disclosure. In some embodiments, an analysis for determining that a user has exited the refined geofence area of a composite geofence can change dynamically in response to a particular configuration of the composite geofence.

For example, a larger number of additional geofences and/or a smaller separation between additional geofences might cause a composite geofence to automatically switch to requiring two or more individual geofences to trigger an exit alert before determining that an individual has exited the refined geofence area. With reference to the drawings, this could, for example, be seen as the four-member composite geofence 400 of FIG. 4 generating an exit alert/notification in response to determining that the individual has triggered any given one of the four additional geofences, whereas the eight-member composite geofence 500 of FIG. 5 might not generate an exit alert/notification until the individual has triggered at least two of the eight additional geofences.

The foregoing discussion makes reference to examples that utilize one or more exit triggers from the individual, constituent geofences of a composite geofence to generate a determination that an individual has exited a refined geofence area associated with or provided by the composite geofence. In some embodiments, it is noted that a composite geofence can additionally, or alternatively, be configured such that an overall exit notification (e.g., from the composite geofence and/or refined geofence area associated with the composite geofence) is based instead on receiving entry triggers from one or more of the constituent geofences of the composite geofence.

Figure 6:
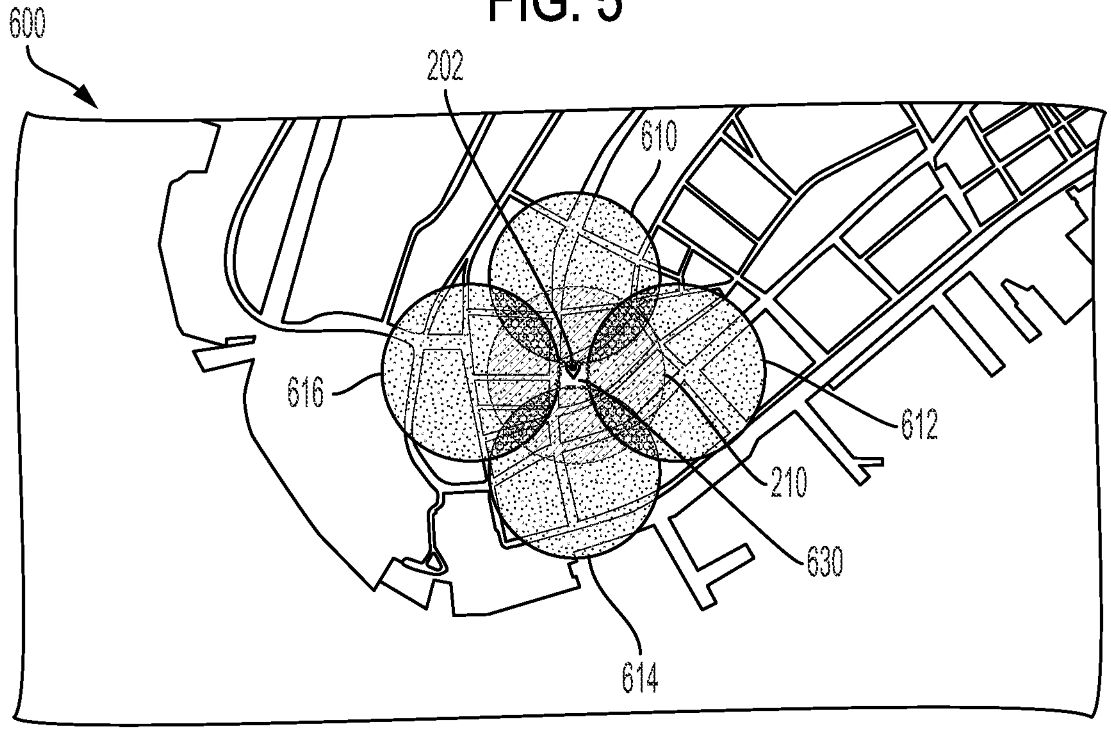
FIG. 6 depicts an example composite geofence utilizing individual geofence entry triggers to generate an exit notification from the refined geofence area of the composite geofence.

One example of a composite geofence configuration that utilizes entry triggers from individual geofences to determine an overall exit notification for a composite geofence 600 is illustrated in FIG. 6. As illustrated, composite geofence 600 can be built around (e.g., registered relative to) the same central geofence 210 and central coordinate 202 as described in the examples above. Like the composite geofence 100, illustrated in FIG. 1, and the composite geofence 300, illustrated in FIG. 3, composite geofence 600 can utilize a total of four individual geofences (or five individual geofences if the central geofence 210 is included). However, instead of overlapping all of the individual geofences such that their union creates a refined geofence area, composite geofence 600 can instead avoid the overlapping of any individual geofences within its refined geofence area 630.

In one illustrative example, composite geofence 600 can include a refined geofence area 630 given as the portion of central geofence 210 that is not also contained in any of the four additional geofences 610, 612, 614, and 616. Accordingly, for a user initially located within refined geofence area 630, the receipt of an entry trigger from one or more of the additional geofences 610-616 (e.g., indicating that the user has entered one of the four additional geofences) can be used to infer that the user therefore must no longer be located within the refined geofence area 630 and has exited.

In some embodiments, various additional geofence layers such as those described in the examples above (e.g., with respect to FIGS. 1-5) can be automatically registered and combined with a single, central geofence. In some examples, a composite geofence can be generated based at least in part on one or more additional geofence layers and the single, central geofence. The single, central geofence may be manually input by a user or automatically generated. In some embodiments, rather than defining the single, central geofence, a user can be presented with a geofence creation or registration interface where the user specifies the size, shape, and/or dimensions of a desired geofence area. Subsequently, a composite geofence area can be created with a refined geofence area that is the same as or substantially identical to the user-requested geofence. Regardless of the exact creation mechanism for generating the presently disclosed composite geofences, the composite geofences described herein can identify exits (and/or entries) with a greater speed and accuracy than may be achieved using a single geofence. As a result, the actual (e.g., effective or actionable) geofence radius provided by the composite geofence is significantly reduced in comparison to the conventional approach that utilizes only a single geofence. Additionally, it is noted that the actionable geofence radius provided by the composite geofences described herein is significantly reduced in comparison to the radius of any one of the individual, constituent geofences utilized in constructing a given composite geofence, as previously described above.

The above examples have assumed that multiple additional geofences can be registered to generate the composite geofence without limitation. However, some existing geofence systems and solutions (e.g., with which the composite geofences of the present disclosure could be implemented or integrated) may impose various limitations on geofence registration. For example, a geofence system may permit a maximum of only 20 geofences to be registered at any given moment in time. In some embodiments, when a limit is present on the maximum number of simultaneous geofences that can exist, the number of additional geofences utilized in the presently disclosed composite geofences can need to be dynamically reduced or limited—particularly for users who wish to have multiple active geofences across multiple different locations.

In some embodiments, a first strategy for operating within the confines of a limited number of allowed geofences can be based on real-time, dynamic creation and deletion of the additional geofences needed for a composite geofence. For example, some scenarios might utilize a composite geofence only to generate exit notifications, rather than both entry and exit notifications. As such, even if a user requests a composite geofence for a certain location, the additional geofences included in the composite geofence do not need to be registered until it is determined that the user has actually entered the geofenced area (or is approaching the area that is to be geofenced for exit notifications via the composite geofence). The entry determination can, in such scenarios, be based on a single geofence such as central geofence 210.

Subsequently, in response to receiving an entry trigger from central geofence 210, the requisite additional geofences can be automatically registered and combined with central geofence 210 in order to thereby generate the composite geofence as desired. Similarly, in order to maximize the availability of geofences that can be created under the cap on the maximum number of geofences, the additional geofences can all be removed automatically in response to a determination that the user has exited the composite geofence. More particularly, this removal can be performed in response to a determination that the user has exited the refined geofence area of the composite geofence (e.g., the user has exited one or more of the additional geofences that were added) or can be performed in response to a determination that the user has exited the original, central geofence 210. Note that in the latter scenario, generating a notification that the user has exited the refined geofence area is a separate event from removing the composite geofence—the exit notification may still be generated as soon as an exit trigger is received from one or more of the additional geofences; however, the removal of the additional geofence layers included in the composite geofence does not proceed until a later time at which an exit trigger is specifically received from the original, central geofence 210.

In some embodiments, when a user has multiple geofences in a same (or similar) location(s), an automatic process of geofence unification can be performed to combine the previously separate geofences into a single, composite geofence, where the number of constituent geofences in the unified composite geofence is less than or equal to the total number of geofences prior to the unification process. If geofence unification is not possible or otherwise not desirable for computation, then the number of additional geofences in each separate composite geofence can be reduced in order to bring the total number of registered geofences to a desired point below the maximum permissible threshold of simultaneously active geofences.

In another scenario, a user might enter two or more geofences at geographically separate and distinct locations, such that there is no ability to combine the individual geofences via the geofence unification process. Depending at least in part on the number of available geofence registration slots remaining before the geofence maximum (e.g., a geofence registration threshold) is reached, one or more of the requested geofences can be provided as a single geofence rather than as a composite geofence, allowing a preferred location to still obtain the benefits of the composite geofence. In some embodiments, each one of the multiple requested geofence locations can be provisioned with a composite geofence, where the composite geofences have a reduced number of additional geofence layers in order to remain underneath the maximum geofence threshold.

In some embodiments, when users enter or request a number of distinct geofences that would be close to the maximum geofence threshold number even without generating any composite geofences (e.g., a user requests 15 different geofences when the maximum allowed is 20), additional steps can be taken to still provide the performance improvements of the presently disclosed composite geofences without exceeding the maximum geofence threshold. For example, when a new composite geofence is requested and there are insufficient geofence registration slots available to create the new composite geofence as requested, additional geofence layers can be automatically removed from the user's other composite geofences, based on factors such as the age of the geofence (e.g., remove oldest unused geofences first); an indicated priority level of the geofence (e.g., priority level 3 is the first removed, then priority level 2, and priority level 1 is never removed, etc.); whether the geofence is currently being used; etc. In some embodiments, composite geofences can be generated only in response to determining that a user has entered an already existing single/individual geofence and can then be removed upon the user exiting the single/individual geofence to which the additional geofence layers were previously added. It is noted that this on-demand provisioning and de-provisioning scheme with respect to additional geofence layers can be utilized on its own, or in combination with one or more of the foregoing and following techniques, without departing from the scope of the present disclosure.

In some examples, if a sufficient number of existing geofences cannot be identified for removal, then a newly requested composite geofence can be created with a reduced number of additional geofence registration slots, up to the threshold number of maximum allowed geofences. In some embodiments, the reduced number of additional geofence registration slots can be as small as one or zero.

In some cases, existing but currently unused composite geofences can be temporarily removed in order to create a sufficient number of free geofence registration slots to support the creation of a newly requested composite geofence. For instance, in response to determining that a user has exited a newly requested composite geofence, the newly requested composite geofence can be deactivated. Previously requested or existing geofences and/or geofence layers that were temporarily removed to support the creation of the newly requested composite geofence can then be restored (e.g., re-registered and added back for that user). For example, if a user requests composite geofences to be registered for his home and for his work, the work geofence can be registered and the home geofence temporarily unregistered once the user arrives at work. Once the user exits the work geofence, the work geofence can be temporarily unregistered and the home geofence can be re-registered and re-activated prior to the user's arrival at home. In order to mitigate the risk of a temporarily suspended geofence that is not re-registered when it should be, the dynamic suspending and re-registering of a user's composite geofences can be performed as a client-side function (e.g., on the user's smartphone or other computing device).

As discussed throughout the present disclosure, the exact configuration of the composite geofences and the resultant refined geofence areas can be adjusted in order to fit a wide variety of requested geofence sizes, shapes, and user needs/use cases. For example, when the radius of the refined geofence area is significantly smaller than the minimum geofence radius for an individual geofence, there is the possibility that false positives will arise (e.g., an exit notification is generated but the user has not actually exited the location that is geofenced). False positives can be reduced or minimized in several different ways. For example, the distance offset between an additional geofence or geofence layer and the central coordinate 202 of central geofence 210 (which is also the central coordinate of the composite geofence) can be reduced, resulting in an increase in the size of the refined geofence area itself. This is because the farther away that an additional geofence is from central coordinate 202, the smaller the refined geofence area 230 will be (e.g., because the refined geofence area 230 can be calculated as the union of all of the individual geofences of a composite geofence). However, increasing the size of the refined geofence area itself can be undesirable in some situations, given that the refined geofence areas are often created with the express goal of having a small area.

Rather than increasing the size of the refined geofence area, additional analysis and processing can be performed before generating an exit notification indicating that the user has left the refined geofence area. This can be achieved, for example, by analyzing the distance between the user's instantaneous location and the geofence center (e.g., central coordinate 202) at the time that any one of the individual geofences of the composite geofences is triggered—if the distance between the user and the central coordinate 202 of the composite geofence is less than some pre-defined threshold, then it is more likely that a false positive exists, and that exit trigger can be ignored and the next layer(s) of the composite geofence can be relied upon in generating the exit notification.

In addition to filtering individual exit triggers from the constituent geofences based on user distance from central coordinate 202, the individual exit triggers can also be filtered based on time. If a user specifies a desired start and/or end time when creating a given composite geofence, smaller trigger distances can be approved when they occur closer in time to the user-specified start or end time for a composite geofence. For example, a user might have a home geofence and a work geofence, where the work geofence is associated with or scheduled for a specified start time of 9 AM (e.g., a geofence scheduling/registration system is configured to create or otherwise activate the work geofence at the specified time, which could be based on the user's schedule or expectation that work will begin at 9 AM, for example).

In some embodiments, in a multiple geofence environment where the geofences are non-overlapping, the first geofence must be exited before the second geofence can be entered. Accordingly, the exit trigger filtering criteria described above can be further extended such that the closer to the start time of another geofence, the smaller the exit trigger distance that will be approved for the current geofence. For example, the closer in time to the scheduled start of the upcoming work geofence, the smaller the distance threshold that can be used for filtering exit triggers and generating exit notifications for the home geofence. In other words, approving a geofence trigger with a distance from center of only 20 m that occurs 20 minutes before the scheduled start time of an upcoming geofence is riskier to approve (and a better option would likely be to wait for a confirmatory exit trigger from a second/the next layer of the composite geofence) than the same 20 m trigger when it occurs only 7 minutes before the scheduled start time of the upcoming geofence. In the latter case, when the current time is very close to the scheduled start time of an upcoming geofence, the consequences of generating a false positive exit notification are appreciably smaller—the composite geofence either catches a correct exit or it "misses" and shows the start notification a few minutes early.

False positives can also be addressed at the time of creation of the composite geofence, in a proactive fashion rather than a reactive fashion. For example, when a user requests or otherwise provides inputs for the creation of a new composite geofence, an additional user input could be solicited to specify a location size for the geofence (e.g., a user could be asked to select from a list of options the entry that best describes the location type for which the geofence is being created, 'Apartment,"Private Home,' Large Office," School,' etc.) Based on this geofenced location information, the composite geofence can be generated accordingly. For the smallest size location option, such as an apartment, a full flower or diamond shaped composite geofence can be created, allowing the smallest refined geofence area size to be used. For a slightly larger sized location, fewer additional geofence layers could be added to the composite geofence and/or the minimum radius of the refined geofence area could be increased. For even larger sized locations, such as offices, it might be possible that the minimum radius (or larger) offered by the single, central geofence 210 is sufficient, in which case a composite geofence need not be generated for that specific user request. Similarly, for schools and other very large (relatively) locations and areas, a single, central geofence 210 can be used at some radius that exceeds the minimum allowable geofence radius.

In some examples, the processes described herein may be performed by a computing device, apparatus, or system. In one example, the processes described herein can be performed by a computing device or system having the computing device architecture 700 of FIG. 7. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
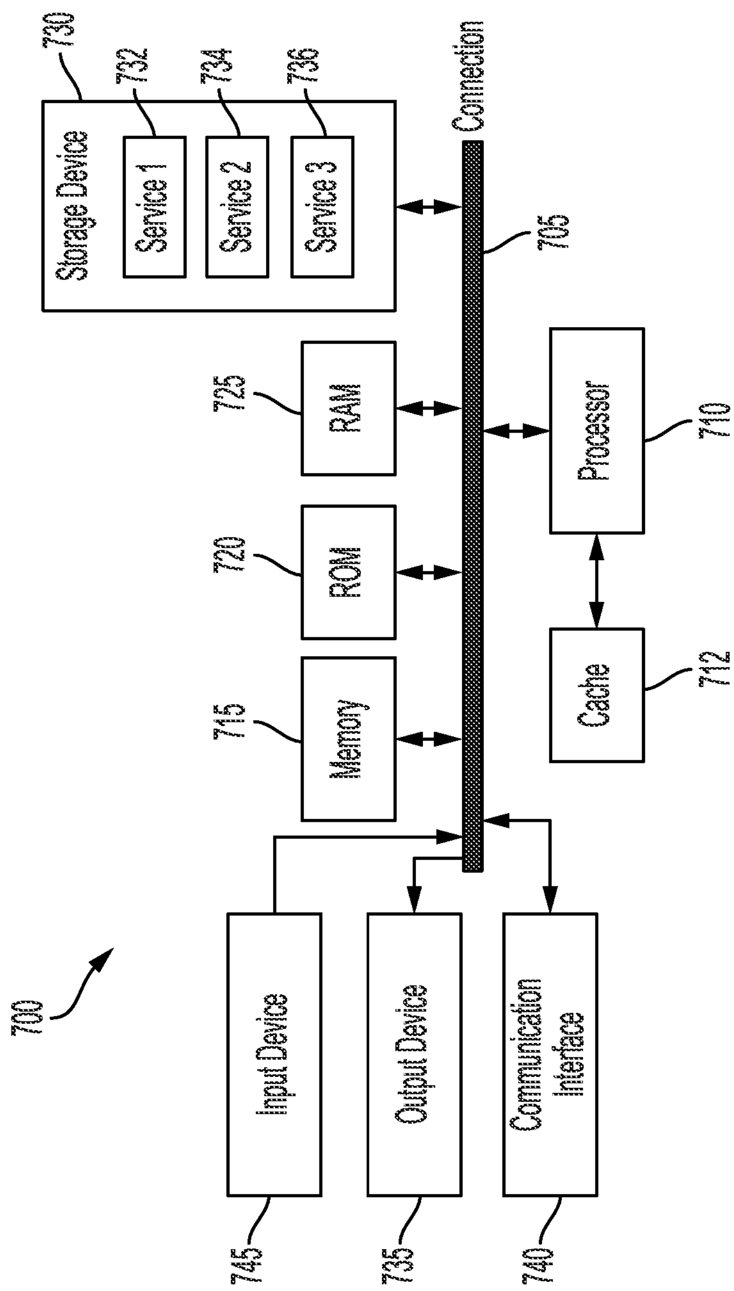
FIG. 7 is a block diagram illustrating an example of a computing system for implementing certain aspects described herein.

FIG. 7 illustrates an example computing device architecture 700 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 700 are shown in electrical communication with each other using connection 705, such as a bus. The example computing device architecture 700 includes a processing unit (CPU or processor) 710 and computing device connection 705 that couples various computing device components including computing device memory 715, such as read only memory (ROM) 720 and random-access memory (RAM) 725, to processor 710.

Computing device architecture 700 can include a cache of high-speed memory connected directly with, in close proximity to, or integrated as part of processor 710. Computing device architecture 700 can copy data from memory 715 and/or the storage device 730 to cache 712 for quick access by processor 710. In this way, the cache can provide a performance boost that avoids processor 710 delays while waiting for data. These and other engines can control or be configured to control processor 710 to perform various actions. Other computing device memory 715 may be available for use as well. Memory 715 can include multiple different types of memory with different performance characteristics. Processor 710 can include any general-purpose processor and a hardware or software service, such as service 1 732, service 2 734, and service 3 736 stored in storage device 730, configured to control processor 710 as well as a special-purpose processor where software instructions are incorporated into the processor design. Processor 710 may be a self-contained system, containing multiple cores or processors, a bus, memory controller, cache, etc. A multi-core processor may be symmetric or asymmetric.

To enable user interaction with the computing device architecture 700, input device 745 can represent any number of input mechanisms, such as a microphone for speech, a touch-sensitive screen for gesture or graphical input, keyboard, mouse, motion input, speech and so forth. Output device 735 can also be one or more of a number of output mechanisms known to those of skill in the art, such as a display, projector, television, speaker device, etc. In some instances, multimodal computing devices can enable a user to provide multiple types of input to communicate with computing device architecture 700. Communication interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. Storage device 730 can include services 732, 734, 736 for controlling processor 710. Other hardware or software modules or engines are contemplated. Storage device 730 can be connected to the computing device connection 705. In one aspect, a hardware module that performs a particular function can include the software component stored in a computer-readable medium in connection with the necessary hardware components, such as processor 710, connection 705, output device 735, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to (" ") and greater than or equal to (" ") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method comprising: registering a first geofence encompassing a first area, wherein the first area is associated with a first location coordinate; generating a composite geofence encompassing a refined geofence area that is a subset of the first area, wherein: the composite geofence includes the first geofence and one or more additional geofences; and each of the one or more additional geofences is registered using an offset relative to the first location coordinate; determining an occurrence of a geofence event for at least one of the one or more additional geofences; and generating, based on the occurrence of the geofence event for at least one of the one or more additional geofences, an exit notification for the refined geofence area of the composite geofence.

Aspect 2: The method of Aspect 1, wherein the geofence event comprises an entry determination or an exit determination for at least one of the one or more additional geofences.

Aspect 3: The method of any of Aspects 1 or 2, wherein the refined geofence area comprises a union of the one or more additional geofences.

Aspect 4: The method of any of Aspects 1 to 3, further comprising generating the composite geofence in response to obtaining an entry determination for the first geofence.

Aspect 5: The method of any of Aspects 1 to 4, wherein the first geofence and the one or more additional geofences have a same size and encompass a same amount of area.

Aspect 6: The method of any of Aspects 1 to 5, wherein generating the composite geofence comprises: registering a first additional geofence using a first offset; registering a second additional geofence using a second offset; registering a third additional geofence using a third offset; and registering a fourth additional geofence using a fourth offset; wherein the first offset, second offset, third offset and fourth offset each include a displacement value relative to the first location coordinate and an angular direction relative to the first location coordinate.

Aspect 7: The method of Aspect 6, wherein the first offset, second offset, third offset and fourth offset each include a same displacement value and a different angular direction.

Aspect 8: The method of any of Aspects 6 or 7, wherein the first offset, second offset, third offset and fourth offset include angular directions separated by 90 degrees.

Aspect 9: The method of any of Aspects 1 to 8, wherein generating the composite geofence further comprises generating a first geofence refinement layer, wherein the first geofence refinement layer includes each of the one or more additional geofences.

Aspect 10: The method of Aspect 9, wherein generating the composite geofence further comprises generating a second geofence refinement layer, wherein the second geofence refinement layer includes one or more second additional geofences, each second additional geofence offset from the additional geofences of the first geofence refinement layer.

Aspect 11: The method of Aspect 4, further comprising removing the one or more additional geofences in response to obtaining an exit determination for the first geofence.

Aspect 12: A system comprising: one or more processors; and one or more computer-readable storage media having computer-readable instructions stored thereon, wherein the computer-readable instructions, when executed by the one or more processors, cause the one or more processors to: register a first geofence encompassing a first area, wherein the first area is associated with a first location coordinate; generate a composite geofence encompassing a refined geofence area that is a subset of the first area, wherein: the composite geofence includes the first geofence and one or more additional geofences; and each of the one or more additional geofences is registered using an offset relative to the first location coordinate; determine an occurrence of a geofence event for at least one of the one or more additional geofences; and generate, based on the occurrence of the geofence event for at least one of the one or more additional geofences, an exit notification for the refined geofence area of the composite geofence.

Aspect 13: The system of Aspect 12, wherein the geofence event comprises an entry determination or an exit determination for at least one of the one or more additional geofences.

Aspect 14: The system of any of Aspects 12 or 13, wherein the refined geofence area comprises a union of the one or more additional geofences.

Aspect 15: The system of any of Aspects 12 to 14, wherein the computer-readable instructions further cause the one or more processors to generate the composite geofence in response to obtaining an entry determination for the first geofence.

Aspect 16: The system of any of Aspects 12 to 15, wherein the first geofence and the one or more additional geofences have a same size and encompass a same amount of area.

Aspect 17: The system of any of Aspects 12 to 16, wherein to generate the composite geofence, the computer-readable instructions cause the one or more processors to: register a first additional geofence using a first offset; register a second additional geofence using a second offset; register a third additional geofence using a third offset; and register a fourth additional geofence using a fourth offset; wherein the first offset, second offset, third offset and fourth offset each include a displacement value relative to the first location coordinate and an angular direction relative to the first location coordinate.

Aspect 18: The system of Aspect 17, wherein the first offset, second offset, third offset and fourth offset each include a same displacement value and a different angular direction.

Aspect 19: The system of any of Aspects 17 or 18, wherein the first offset, second offset, third offset and fourth offset include angular directions separated by 90 degrees.

Aspect 20: The system of any of Aspects 12 to 19, wherein to generate the composite geofence, the computer-readable instructions further cause the one or more processors to: generate a first geofence refinement layer, wherein the first geofence refinement layer includes each of the one or more additional geofences; and generate a second geofence refinement layer, wherein the second geofence refinement layer includes one or more second additional geofences, each second additional geofence offset from the additional geofences of the first geofence refinement layer.

Aspect 21: A computer-readable storage medium storing instructions that, when executed by one or more processors, cause the one or more processors to perform operations according to any of Aspects 1 to 20.

Aspect 22: An apparatus for processing one or more data samples, comprising one or more means for performing operations according to any of Aspects 1 to 20.

What is claimed is:

1. A method comprising:

registering a first geofence encompassing a first area, wherein the first area is associated with a first location coordinate;

generating a composite geofence encompassing a refined geofence area that is a subset of the first area, wherein:

the composite geofence includes the first geofence and one or more additional geofences;

the refined geofence area comprises an overlap between the first geofence and each additional geofence of the one or more additional geofences, wherein the refined geofence area is encompassed within each additional geofence of the one or more additional geofences; and each of the one or more additional geofences is registered using a respective offset relative to the first location coordinate, the respective offset indicative of a displacement between the first location coordinate and a respective central coordinate of each additional geofence of the one or more additional geofences;

determining an occurrence of a geofence event for at least one of the one or more additional geofences; and generating, based on the occurrence of the geofence event for at least one of the one or more additional geofences, an exit notification for the refined geofence area of the composite geofence.

2. The method of claim 1, wherein the geofence event comprises an entry determination or an exit determination for at least one of the one or more additional geofences.

3. The method of claim 1, wherein the refined geofence area comprises a union of the one or more additional geofences.

4. The method of claim 1, further comprising generating the composite geofence in response to obtaining an entry determination for the first geofence.

5. The method of claim 1, wherein the first geofence and the one or more additional geofences have a same size and encompass a same amount of area.

6. The method of claim 1, wherein generating the composite geofence comprises:

registering a first additional geofence using a first offset;

registering a second additional geofence using a second offset;

registering a third additional geofence using a third offset; and registering a fourth additional geofence using a fourth offset;

wherein the first offset, second offset, third offset and fourth offset each include a displacement value relative to the first location coordinate and an angular direction relative to the first location coordinate.

7. The method of claim 6, wherein the first offset, second offset, third offset and fourth offset each include a same displacement value and a different angular direction.

8. The method of claim 6, wherein the first offset, second offset, third offset and fourth offset include angular directions separated by 90 degrees.

9. The method of claim 1, wherein generating the composite geofence further comprises generating a first geofence refinement layer, wherein the first geofence refinement layer includes each of the one or more additional geofences.

10. The method of claim 9, wherein generating the composite geofence further comprises generating a second geofence refinement layer, wherein the second geofence refinement layer includes one or more second additional geofences, each second additional geofence offset from the additional geofences of the first geofence refinement layer.

11. The method of claim 4, further comprising removing the one or more additional geofences in response to obtaining an exit determination for the first geofence.

12. A system comprising:

one or more processors; and one or more computer-readable storage media having computer-readable instructions stored thereon, wherein the computer-readable instructions, when executed by the one or more processors, cause the one or more processors to:

register a first geofence encompassing a first area, wherein the first area is associated with a first location coordinate;

generate a composite geofence encompassing a refined geofence area that is a subset of the first area, wherein:

the composite geofence includes the first geofence and one or more additional geofences;

the refined geofence area comprises an overlap between the first geofence and each additional geofence of the one or more additional geofences, wherein the refined geofence area is encompassed within each additional geofence of the one or more additional geofences; and each of the one or more additional geofences is registered using a respective offset relative to the first location coordinate, the respective offset indicative of a displacement between the first location coordinate and a respective central coordinate of each additional geofence of the one or more additional geofences;

determine an occurrence of a geofence event for at least one of the one or more additional geofences; and generate, based on the occurrence of the geofence event for at least one of the one or more additional geofences, an exit notification for the refined geofence area of the composite geofence.

13. The system of claim 12, wherein the geofence event comprises an entry determination or an exit determination for at least one of the one or more additional geofences.

14. The system of claim 12, wherein the refined geofence area comprises a union of the one or more additional geofences.

15. The system of claim 12, wherein the computer-readable instructions further cause the one or more processors to generate the composite geofence in response to obtaining an entry determination for the first geofence.

16. The system of claim 12, wherein the first geofence and the one or more additional geofences have a same size and encompass a same amount of area.

17. The system of claim 12, wherein to generate the composite geofence, the computer-readable instructions cause the one or more processors to:

register a first additional geofence using a first offset;

register a second additional geofence using a second offset;

register a third additional geofence using a third offset; and register a fourth additional geofence using a fourth offset;

wherein the first offset, second offset, third offset and fourth offset each include a displacement value relative to the first location coordinate and an angular direction relative to the first location coordinate.

18. The system of claim 17, wherein the first offset, second offset, third offset and fourth offset each include a same displacement value and a different angular direction.

19. The system of claim 17, wherein the first offset, second offset, third offset and fourth offset include angular directions separated by 90 degrees.

20. The system of claim 12, wherein to generate the composite geofence, the computer-readable instructions further cause the one or more processors to:

generate a first geofence refinement layer, wherein the first geofence refinement layer includes each of the one or more additional geofences; and generate a second geofence refinement layer, wherein the second geofence refinement layer includes one or more second additional geofences, each second additional geofence offset from the additional geofences of the first geofence refinement layer.

* * * * *